(12) United States Patent
Toshiyuki et al.

(10) Patent No.: US 6,233,035 B1
(45) Date of Patent: May 15, 2001

(54) IMAGE RECORDING APPARATUS AND IMAGE REPRODUCING APPARATUS

(75) Inventors: Sudo Toshiyuki, Kawasaki; Osaka Tsutomu, Yokohama, both of (JP)

(73) Assignee: Mixed Reality Systems Laboratory Inc., Yokohama (JP)

(*) Notice: Subject to any disclaimer, the term of this patent is extended or adjusted under 35 U.S.C. 154(b) by 0 days.

(21) Appl. No.: 09/273,747

(22) Filed: Mar. 22, 1999

(30) Foreign Application Priority Data

Jun. 4, 1998 (JP) .................................................. 10-155517

(51) Int. Cl.[7] .......................... G03B 35/24; G02B 27/22; H04N 13/00
(52) U.S. Cl. ............................ 355/22; 396/330; 348/54; 348/59
(58) Field of Search .................................... 396/327, 330; 355/22; 348/54, 59; 359/463

(56) References Cited

U.S. PATENT DOCUMENTS

| | | | |
|---|---|---|---|
| 4,600,297 | * 7/1986 | Winnek | 355/22 |
| 5,113,213 | * 5/1992 | Sandor et al. | 355/22 |
| 5,543,874 | * 8/1996 | Winnek | 396/330 |
| 5,680,171 | * 10/1997 | Lo et al. | 348/42 |

* cited by examiner

Primary Examiner—Alan A. Mathews
(74) Attorney, Agent, or Firm—Fitzpatrick, Cella, Harper & Scinto

(57) ABSTRACT

An image recording apparatus has an image display device for displaying image information, a lens array having a plurality of element lenses for focusing the image information displayed in the image display device, the element lenses being arrayed at a predetermined pitch, an image recording medium located at a focus plane of the lens array, and a beam controller for controlling a beam passing through an aperture for each element lens out of the plurality of element lenses. The image information displayed in the image display device for every element lens is successively recorded in the image recording medium by the beam controller.

11 Claims, 10 Drawing Sheets

PHOTOGRAPHING STATE IN IP

REPRODUCING STATE IN IP

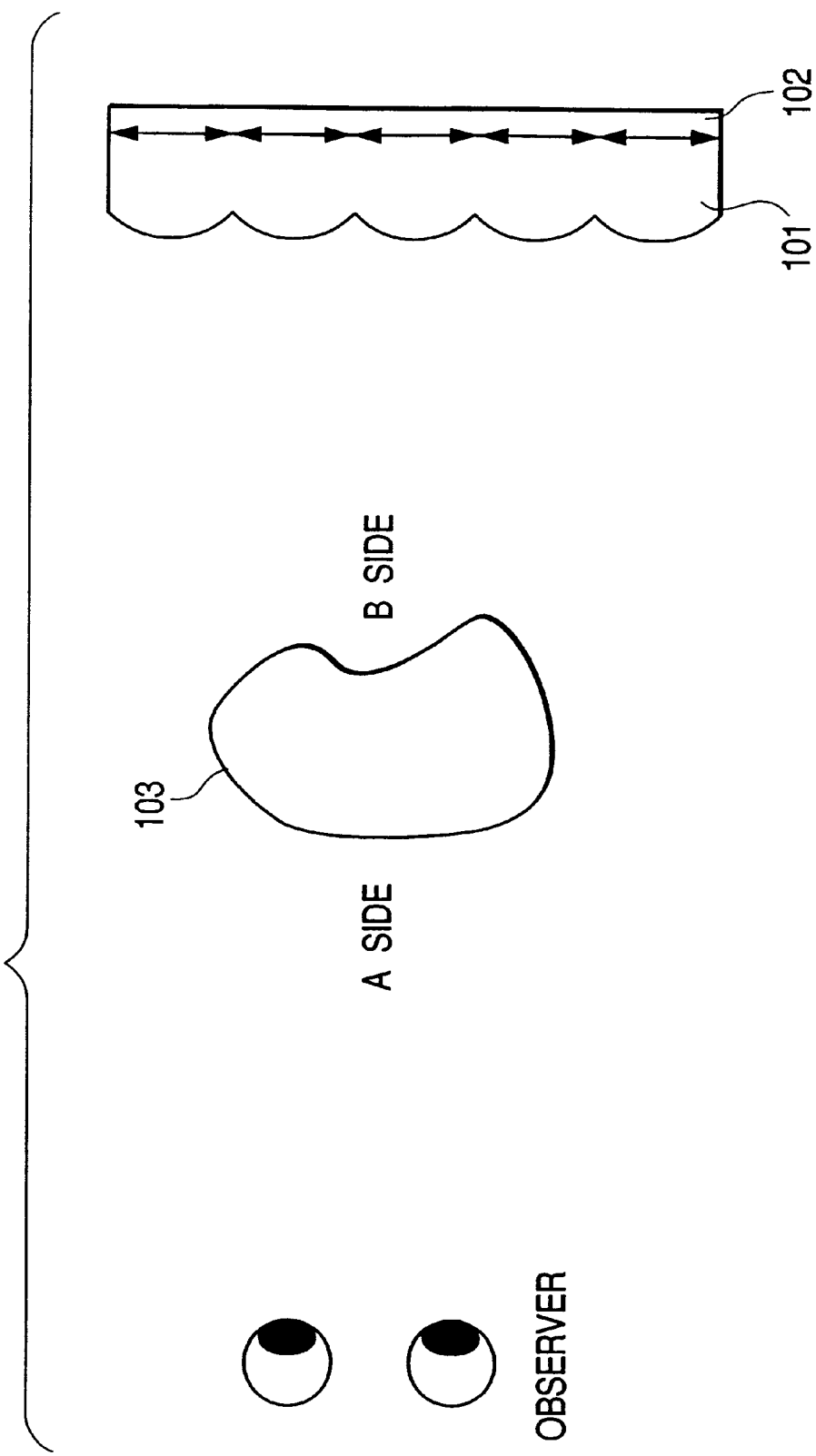

IMAGE RECORDING APPARATUS AND IMAGE REPRODUCING APPARATUS

BACKGROUND OF THE INVENTION

1. Field of the Invention

The present invention relates to an image recording apparatus and an image reproducing apparatus for recording and reproducing a three-dimensional image and, more particularly, to those that permit an observer to observe a three-dimensional image, recorded in an image recording means, in a natural and good state tirelessly.

2. Related Background Art

A variety of methods have been attempted heretofore for recording image information of a stereoscopic object (three-dimensional object) in the image recording means and stereoscopically reproducing the image information recorded in the image recording means.

Among these methods, the IP (integral photo) method is often used as a method for recording and reproducing the three-dimensional image without use of special glasses or the like. FIG. 9A and FIG. 9B are explanatory diagrams to show a three-dimensional image recording apparatus and a three-dimensional image reproducing apparatus according to this method.

In FIG. 9A reference numeral 101 designates a microlens array called a fly's eye lens which is a two dimensional array of microscopic lenses 101a, as shown in FIG. 10, like a compound eye of an insect.

A photographic plate 102 is placed behind the microlens array 101. Microscopic inverted images 104 of subject 103 are formed on the photographic plate 102 by the respective lenses 101a to expose the dry plate to be recorded therein. A positive (positive image) is made in the same size from the photographic plate 102 in which the image information was recorded. The microlens array 101 as illustrated in FIG. 9B is placed correctly at the original position on the front surface of the substrate 102a thus made and the substrate 102a is illuminated from its back.

Beams from the respective images in the positive recorded in the substrate 102a travel backward in the same paths as during the photographing operation to reproduce a three-dimensional real image 105 at the original position of the subject. An observer 106 observes this real image 105 thus reproduced.

The three-dimensional image recording and reproducing apparatus illustrated in FIGS. 9A and 9B had the following problems. First, they were able to record and reproduce only stereoscopic image information of actually existing subjects. Therefore, a virtual three-dimensional object formed arbitrarily had to be recorded and reproduced by other methods.

Second, the depth of focus of the microlens array 101 is not so deep, so that a blur appears in the recorded images. In the IP method, because the subject 103 has depths during recording of the three-dimensional image, distances from the photographic plate 102 differ depending upon portions of the subject.

Since the microlenses of the microlens array have a constant focal length, each of images off the focal depth among the inverted images formed on the photographic plate includes a defocus. Therefore, deterioration of quality of image occurs due to the defocus in the three-dimensional image recorded and reproduced in this state.

Third, the three-dimensional image reproduced becomes a pseudo-stereoscopic image in certain cases. FIG. 11 and FIG. 12 are explanatory diagrams to explain such a case.

FIG. 11 shows a state during the recording operation of a three-dimensional image. In the same figure image information of side B of the subject 103 is recorded on the photographic plate 102.

FIG. 12 shows a state in which this IP recorded in the photographic plate 102 is reproduced. As illustrated in FIG. 12, the observer observes the image from side A of the three-dimensional image 103, but the information of the image recorded in the photographic plate 102 includes only the image information of side B.

Therefore, the three-dimensional image 103 is seen as if the back side of the object is seen through and in addition, projections and depressions of the image information are observed in an inverse state.

SUMMARY OF THE INVENTION

An object of the present invention is, therefore, to provide an image recording apparatus and an image reproducing apparatus permitting observation of a good stereoscopic image by making use of the recording and reproducing principles of the three-dimensional image in the conventional IP (integral photo) method. (1-1) An image recording apparatus of the present invention comprises an image display device for displaying image information, a lens array comprising a plurality of element lenses for focusing the image information displayed in the image display device, the element lenses being arrayed at a predetermined pitch, image recording means placed at a focus plane of the lens array, and beam control means for controlling a beam passing through an aperture for each element lens out of the plurality of element lenses, wherein the image information displayed in the image display device for every element lens is successively recorded in the image recording means by the beam control means.

Particularly, the image recording apparatus of the present invention is characterized:

(1-1-1) in that said beam control means comprises an aperture plate having an aperture a size of which is substantially equal to an aperture diameter of said element lenses and shutter means for controlling a beam passing through the aperture of the aperture plate, and wherein the aperture plate and shutter means are moved along a surface of said lens array;

(1-1-2) in that said beam control means comprises a spatial light modulator capable of electronically controlling a transmittance distribution;

(1-1-3) in that said image display device displays image information pieces different from each other in time series and said beam control means is controlled in synchronism with the display to record the image information pieces in mutually different areas of said image recording means, each image information piece by one said element lens;

(1-1-4) in that said lens array is comprised of a microlens array having a plurality of microscopic lenses arrayed two-dimensionally;

(1-1-5) in that said lens array is comprised of a lenticular lens having a plurality of cylindrical lenses having a refractive power in a one-dimensional direction and arrayed in a predetermined direction;

(1-1-6) in that an effective diameter of said microscopic lenses is not less than 0.5 mm nor more than 2 mm;

(1-1-7) in that an effective diameter of said cylindrical lenses in the direction in which the cylindrical lenses have the refractive power is not less than 0.5 mm nor more than 2 mm; and so on.

An image reproducing apparatus of the present invention is characterized:

(2-1) by structure comprising image recording means in which image information is recorded by the image recording apparatus of the structure (1-1), and a lens array opposed to the image recording means, wherein the image information recorded in the image recording means is reproduced through the lens array with illumination light supplied from the side of the image recording means; or (2-2) by structure comprising a lens array having a plurality of element lenses arrayed at a predetermined pitch, and an image display device for electronically displaying image information corresponding to the plurality of element lenses in respective areas for every element lens, wherein the image information is reproduced so that light diverging from microscopic image information among the image information recorded in the respective areas of the image display device is superimposed at a position in the space a fixed distance apart from the lens array.

BRIEF DESCRIPTION OF THE DRAWINGS

FIG. 12 is an explanatory diagram to explain a method for observing a stereoscopic image with the conventional stereoscopic image observing apparatus.

DETAILED DESCRIPTION OF THE PREFERRED EMBODIMENTS

Figure 1:
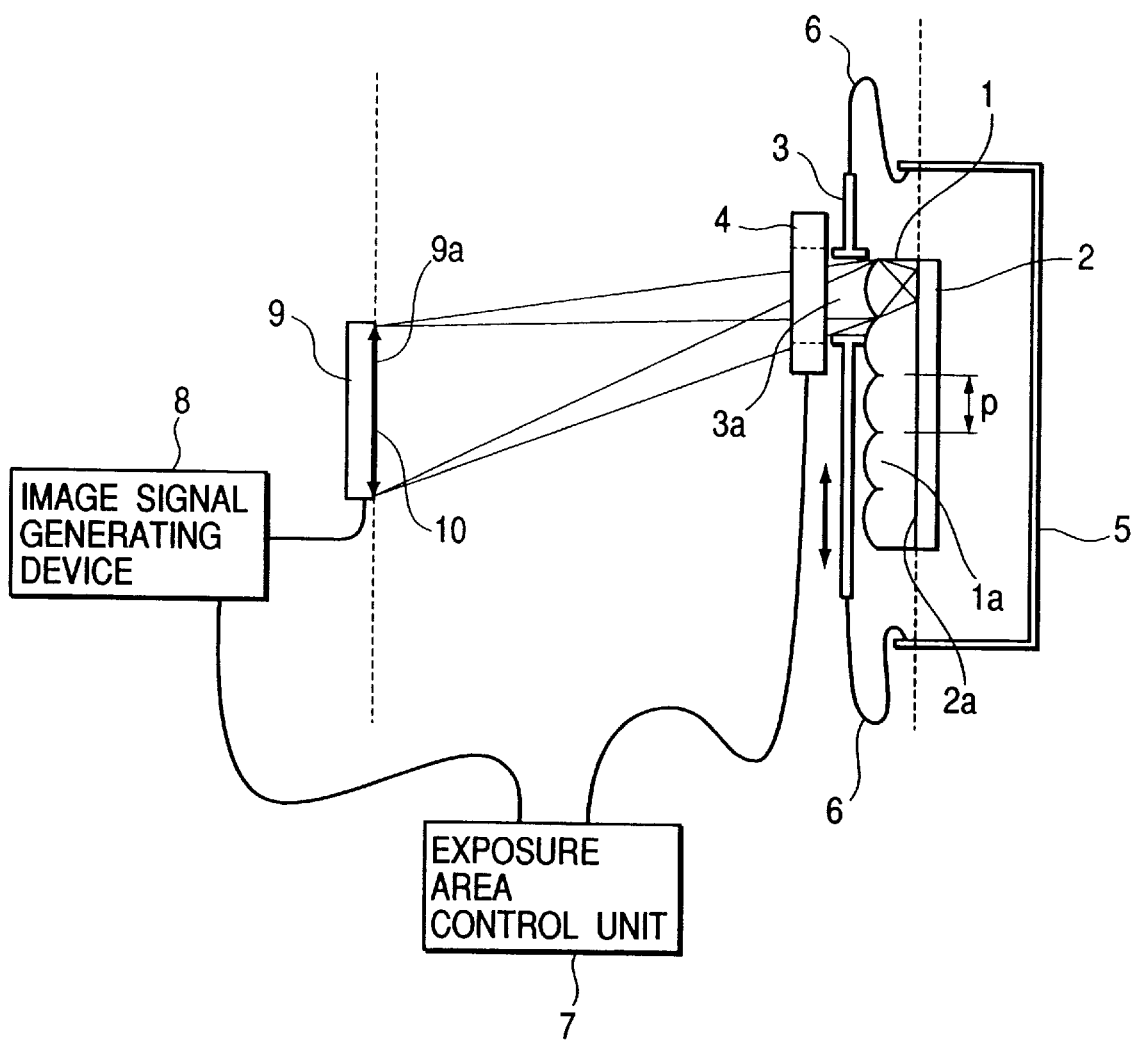
FIG. 1 is a schematic diagram to show the main part of Embodiment 1 of the present invention.

FIG. 1 is a schematic diagram to show the main part of Embodiment 1 of the image recording apparatus according to the present invention. In FIG. 1 an image recording medium 2 is located behind a microlens array (lens array) 1 for formation of IP (integral photo).

In the present embodiment the image recording medium 2 is an exposure-recordable medium, which is one selected from a photographic film, a spatial light modulator of a light writing type, and so on. The lens array 1 is a two-dimensional array of plural element lenses 1a.

These elements 1, 2 are placed in a space blacked out by black box 5 and black screen 6. An aperture plate 3 and a shutter 4 are located in front of the microlens array 1, so that exposure recording onto the image recording medium 2 is carried out with light passing through the aperture plate 3 only during opening periods of the shutter 4.

Each of the aperture plate 3 and the shutter 4 constitutes one element of beam control means. The aperture plate 3 and shutter 4 together are two-dimensionally translated in front of the microlens array 2 by a moving mechanism (not illustrated). The position of the aperture plate 3 and shutter 4 is controlled by exposure area control unit 7, and exposure recording can be carried out through a microlens 1a at an arbitrary position at an arbitrary time onto the image recording medium 2.

In the figure, reference numeral 9 designates an image display device, which is a display element that can display plural images in a switched manner, for example, such as a liquid crystal display, a CRT, or the like. The image display device 9 is located at a position a fixed distance L apart from the microlens array 1.

The image display device 9 is displaying an image 10 based on an input signal from an image signal generating device 8. At this time the image signal generating device 8 captures positional information of the exposure area from the exposure area control unit 7 to determine pixel signals to be displayed, based thereon.

It is a matter of course that the apparatus can also be adapted for a method in which the exposure area control unit 7 captures the information of image from the image signal generating device 8 and carries out the control of the exposure area based thereon contrary to the above.

It is noted that an image surface 9a of the image display device 9 and an image recording surface 2a of the image recording medium 2 are in the image-forming relation through the microlens array 1. Therefore, the image 10 is recorded on the image recording medium 2 without a defocus in the exposure area.

Described next is a method for producing the IP using the image recording apparatus of the above structure. In the present invention, instead of the information light of really existing three-dimensional subjects used in the conventional IP, a plurality of image information beams generated by the image display device 9 are successively recorded in time series at different positions of the image recording medium 2.

Figure 2:
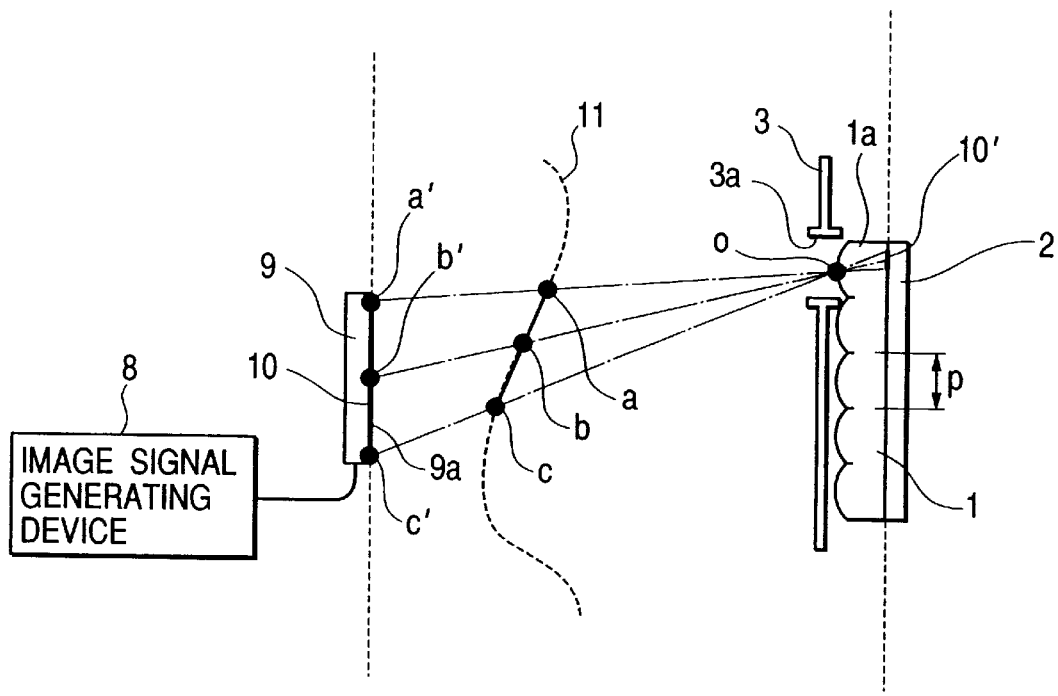
FIG. 2 is an explanatory diagram of stereoscopic image recording in Embodiment 1 of the present invention.

This specific method will be described referring to FIG. 2 (in which the components unnecessary for the description are omitted from the illustration).

An aperture 3a of the aperture plate 3 has the size approximately equal to one element lens 1a of the microlens array 1. In this structure, the apparatus exposes an area on the image recording medium 2 defined one element lens 1a every time to record image information therein. The spacing between adjacent element lenses is set to be extremely small, approximately 1 mm. (A way of determining this lens spacing will be described hereinafter.) When the aperture 3a is located at the position illustrated, the center point of the element lens 1a in the exposure area is defined as O. The image 10 to be displayed on the image display device 9 at this time is obtained as follows. (a-1) A three-dimensional image 11 to be reproduced last is assumed. (a-2) Suppose light diverges from one point O of the element lens 1a. (a-3) A projected image of the three-dimensional image 11 onto the image display surface 9a by the above diverging light is used as the image 10.

For example, supposing IPs for reproducing three points a, b, c composing a part on the three-dimensional image 11 are produced, the image 10 to be displayed can be composed of pixels with luminance information proportional to brightness of respective points a, b, c and at intersecting points a', b', c' between the surface 9a and straight lines connecting the point O to the respective points.

Figure 3:
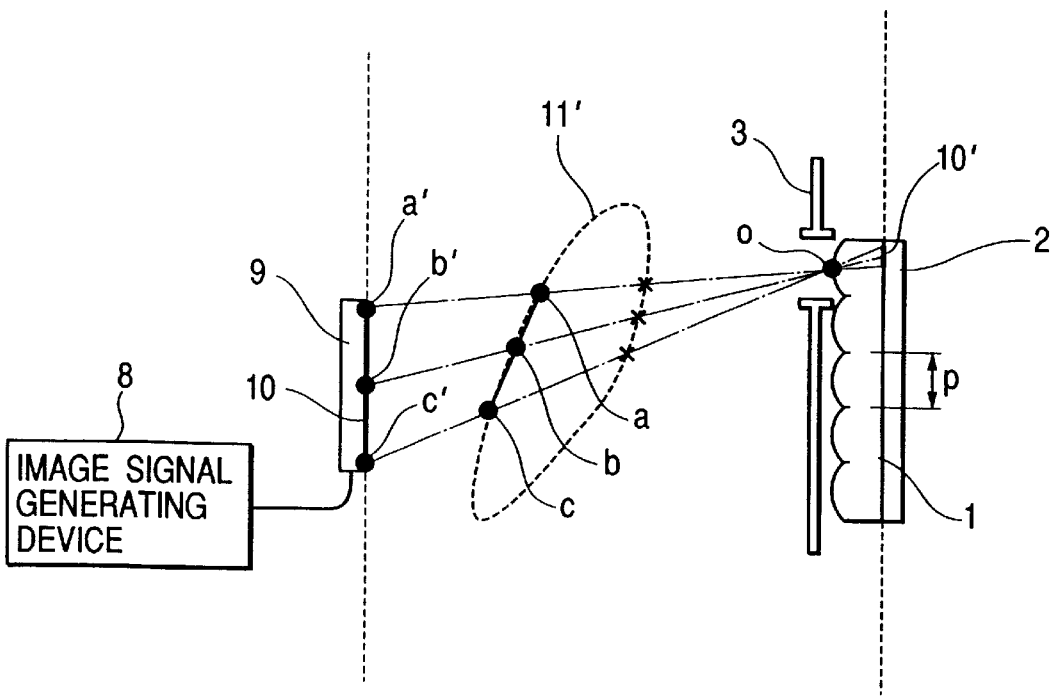
FIG. 3 is an explanatory diagram of stereoscopic image recording in Embodiment 1 of the present invention.

If the rays diverging from the point O each have two or more intersecting points with the three-dimensional image 11' as illustrated in FIG. 3, the image 10 is obtained based on luminance information of points which the diverging rays pass last (most distant points from the point O) out of the points on the three-dimensional image 11'.

This means that only the nearest side of the three-dimensional image to the observer is reproduced on the occasion of reproduction of the three-dimensional image 11'. This achieves the effect of hidden surface removal.

The image 10 is also obtained in the similar fashion with the point O defined at each position in the other exposure areas. A plurality of images 10 generated in this way are displayed in order on the image display device 9 corresponding to the respective exposure areas, thereby effecting exposure recording in each area of the image recording medium 2. This is repeated throughout the entire region and the image information exposure-recorded in the image recording medium 2 is subjected to processing operations including development etc. to be changed into a state capable of being expressed as an intensity distribution of light. The image recording medium 2 is again placed at the original position.

When the image recording medium 2 is illuminated from the back with beams from an illuminating unit, all the image information is formed as superimposed at the original display surface position 9a of the image display device 9. The observer observes this from a position an appropriate distance apart therefrom.

Figure 4:
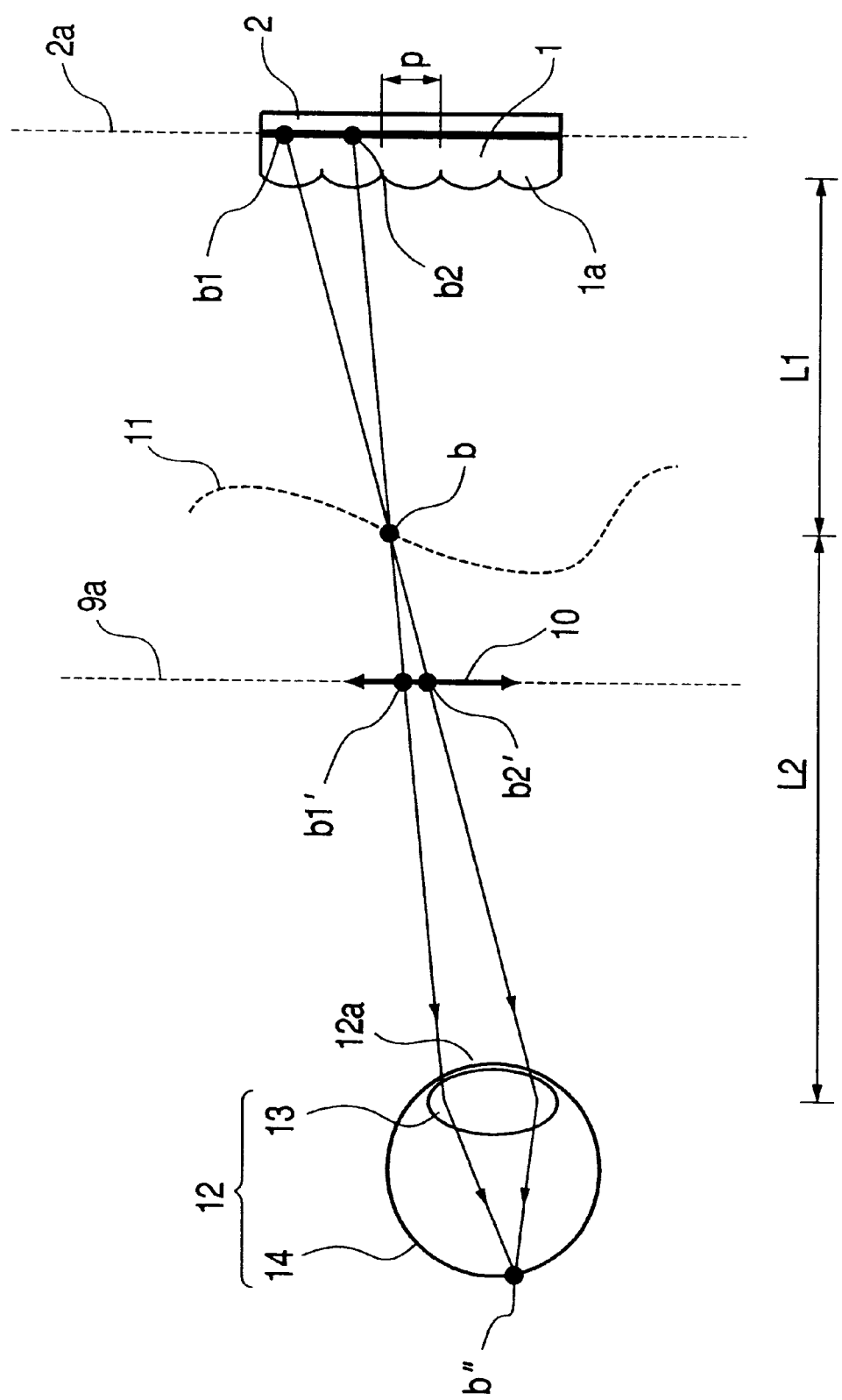
FIG. 4 is an explanatory diagram of stereoscopic image observation in Embodiment 1 of the present invention.

FIG. 4 is an explanatory diagram to show a state in which the three-dimensional image is reproduced with the IPs thus produced by the above method. As an example, reproduction of point b on the three-dimensional image 11 will be discussed. Supposing that the three-dimensional image 11 was recorded in the image recording medium 2 by the method described above, rays for reproducing point b are those emerging from points b1, b2, . . . on the image display surface 2a and passing points b1', b2', respectively, on the image display surface 9a by the action of the microlens array 1.

These rays advance in the form of nearly parallel rays toward the observer 12. If the observer should observe a single ray in this state it would be difficult for the observer to determine from which point the ray emerges.

In contrast, when two or more such rays are incident to the observer's pupil 12a as illustrated, the observer's pupil 12a unconsciously accommodates lens 13 so that those rays again intersect at point b" on retina 14. At this time the observer's pupil 12a is in focus with the intersecting point b of those rays, so as to recognize the point b on the three-dimensional image 11.

This method also permits all the other points on the three-dimensional image 11 to be reproduced according to the same principle, so that the observer can observe the whole of the three-dimensional image 11 in a state satisfying all three-dimensional (3-D) perception including the eye accommodation function and with less fatigue of eye.

For recognition of the three-dimensional image as described above, it is, however, necessary that the diameter of the rays incident to the observer's eye be smaller than the pupil diameter and that at least two or more rays be incident into the pupil. Let d be the diameter of the rays at the position of the observer's pupil and q be a distance between adjacent rays. Then the apparatus of the present embodiment has to satisfy the following conditions.

(b-1) Ray Diameter

Since the rays emerging from the microlens 1 are nearly parallel rays, there is the relation of the ray diameter $d=p$ (where p=the diameter of the microlens 1a). Therefore, a necessary condition is p<(the diameter of the observer's pupil). Since diameters of human pupils range from 2 to 7 mm in general, a sufficient condition is 0.5 mm<p<2 mm. The lower limit value results from the production limit of the lens array. If the lower limit is smaller than this value, the element lenses are too small and production thereof becomes harder.

(b-2) Distance Between Rays

Let L1 be a distance from the point b on the three-dimensional image 11 to the microlens array 1 and L2 be a distance from the point b to the position 12a of the observer's pupil. Then the distance between rays, q, is expressed as $q=p*L2/L1$ from the geometrical relation and this value needs to be not more than the pupil diameter.

From these conditions, the reproduction of three-dimensional image with less fatigue of eye can be effected as described previously when the following conditions are satisfied.

p<(the diameter of the observer's pupil); and $q=p*L2/L1$<(the diameter of the observer's pupil) Taking account of the fact that the diameter of the observer's pupil is not less than about 2 mm, sufficient conditions are as follows.

0.5 mm<p<2 mm and $q=p*L2/L1$<2 mm

The features of the present embodiment can be summarized as follows.

(c-1) The observer can observe the image with less fatigue of eye.

(c-2) The reproduced image has less deterioration of quality due to the defocus of the microlens.

(c-3) The pseudo-stereoscopic image can be prevented.

(c-4) Information of a three-dimensional subject not existing actually can be electrically reproduced and recorded.

The features of (c-1) and (c-2) are as described previously. The features of (c-3) and (c-4) originate in that the image conversion to correct the pseudo stereoscopy can be preliminarily performed during the recording operation by the image signal generating device 8 and that many two-dimensional images are recorded instead of the information of a really existing object. In the above embodiment the performance can be further enhanced by the following modifications.

(d-1) Microlens Array

One feature of the present invention is the less deterioration of quality of reproduced image due to the defocus of the microlens array, and the quality of image can be further enhanced by improving the imaging performance of the microlenses. First, aberration of the lenses can be suppressed if the microlenses are made of aspherical surfaces or if two or more microlens arrays are bonded to each other to perform recording with the plural microlens arrays.

Figure 5:
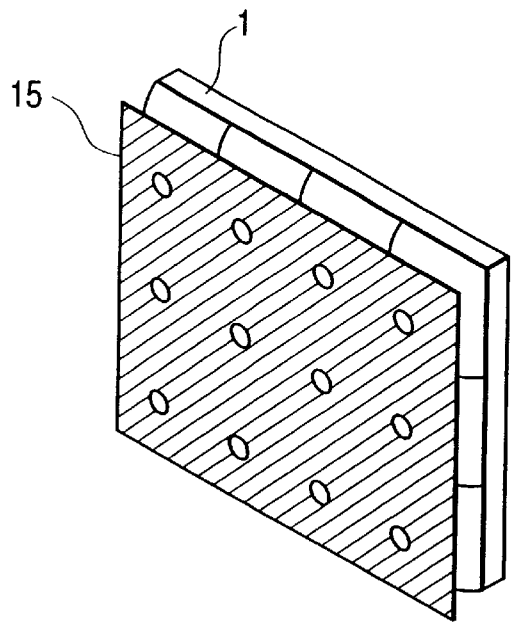
FIG. 5 is an explanatory diagram to show part of FIG. 1.

Second, the numerical aperture of each microlens can be decreased, whereby the depth of focus can be made further deeper, so as to decrease the defocus. This can be accomplished by placing a pinhole array 15 of pinholes aligned at the same pitch as the lens array, in front of the microlens array 1 as illustrated in FIG. 5.

(d-2) Control of Exposure Area

In the aforementioned embodiment the restriction of the exposure area is implemented by the movement of the mechanical shutter 4 and aperture 3. There are some cases in which that structure requires the longer operational time because of its slow moving speed and is also apt to generate vibration, noise, and so on.

Figure 6:
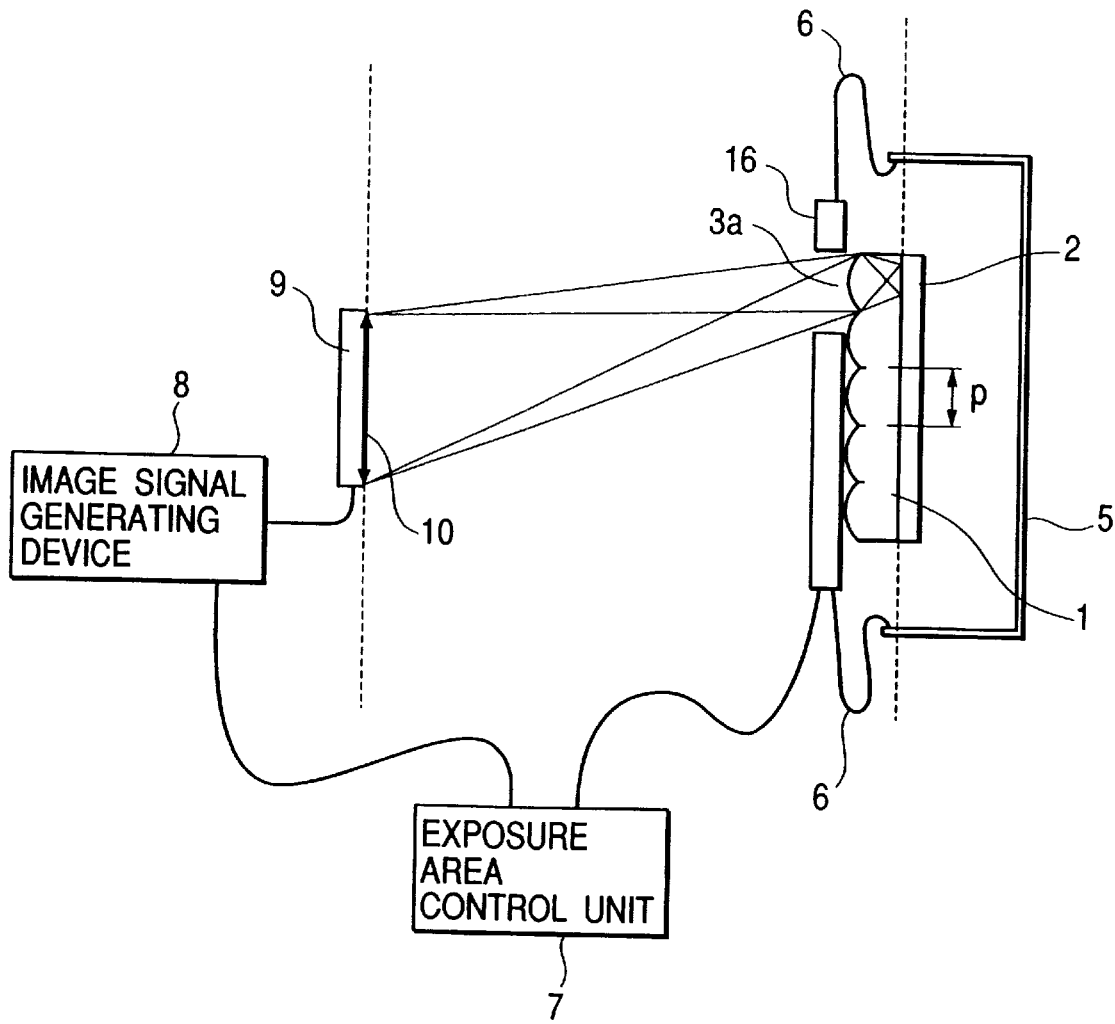
FIG. 6 is a schematic diagram to show the main part of Embodiment 2 of the present invention.

Then, efficient control of exposure area without any moving part can be realized by placing a spatial light modulator 16, for example, of the liquid crystal or the like permitting electronic control of transmittance distribution, in front of the microlens array 1 as illustrated in FIG. 6 and forming the moving aperture 3a thereby.

(d-3) Removal of Vertical Parallax

Figure 7:
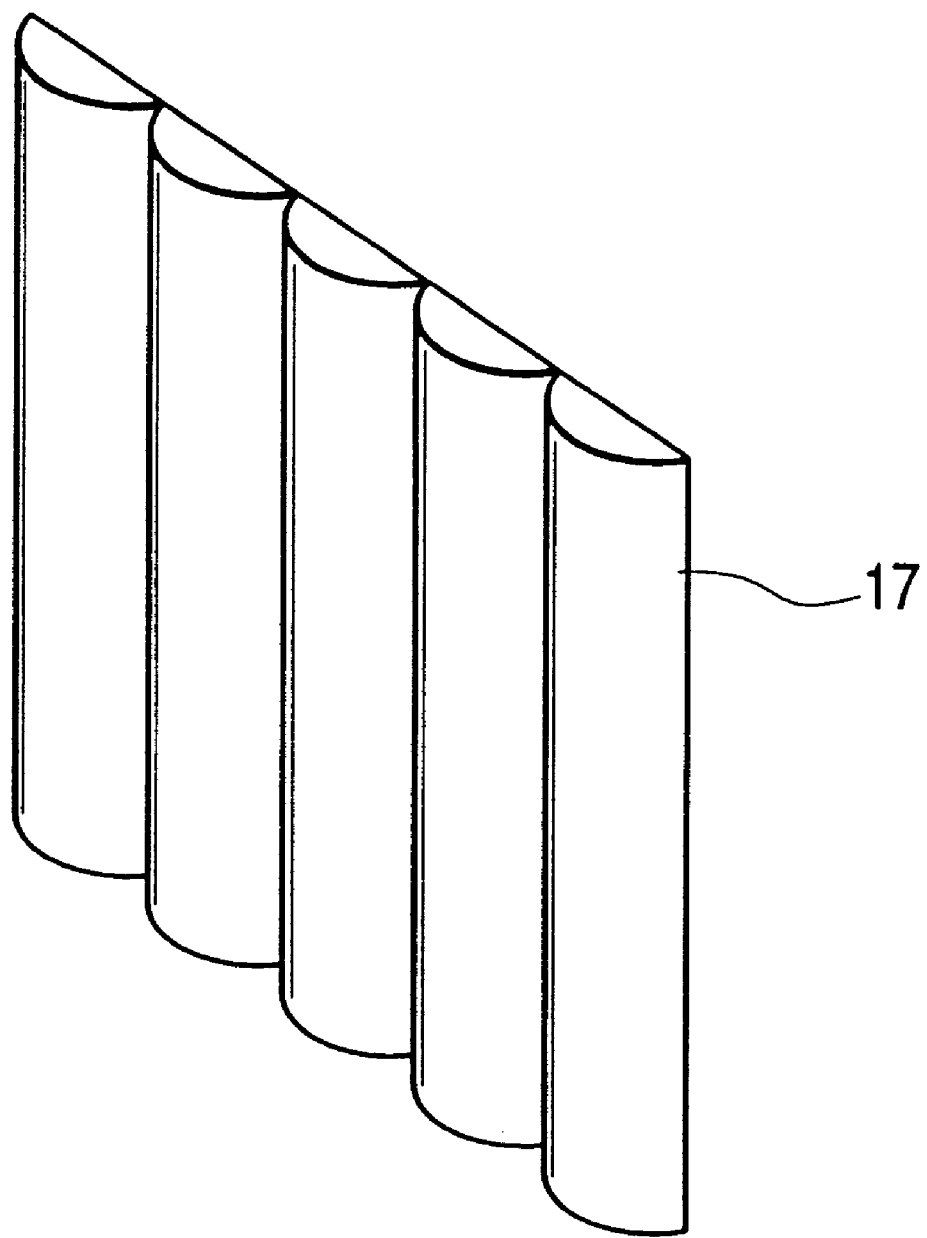
FIG. 7 is an explanatory diagram to show part of Embodiment 3 of the present invention.

The aforementioned embodiment employs the microlens array comprised of the plural microlenses arrayed in a matrix, whereas the image recording apparatus can be constructed using a lenticular lens 17 comprised of plural cylindrical lenses, as illustrated in FIG. 7, arrayed along a one-dimensional direction in order to decrease the information process amount and exposure recording time during the recording operation and simplify the microlens array. This structure also removes the parallax in the vertical direction.

In this case, the exposure area during the recording operation of image is vertically long, and thus the aperture plate 3 and shutter 4 employed are also of such a shape.

A set of images 10 to be displayed on the image display device 9 becomes a set of parallax images having only the horizontal parallax.

When the three-dimensional image recorded by the above structure is reproduced, there is no vertical parallax at all. There still remain, however, the horizontal parallax and the aforementioned action to compensate the eye accommodation mechanism (though only in the horizontal direction), which are particularly important for the stereoscopic recognition of human, and, therefore, degradation of performance can be minimum in the three-dimensional (3-D) perception.

(d-4) Reproduction of Three-dimensional Dynamic Image

Figure 8A:
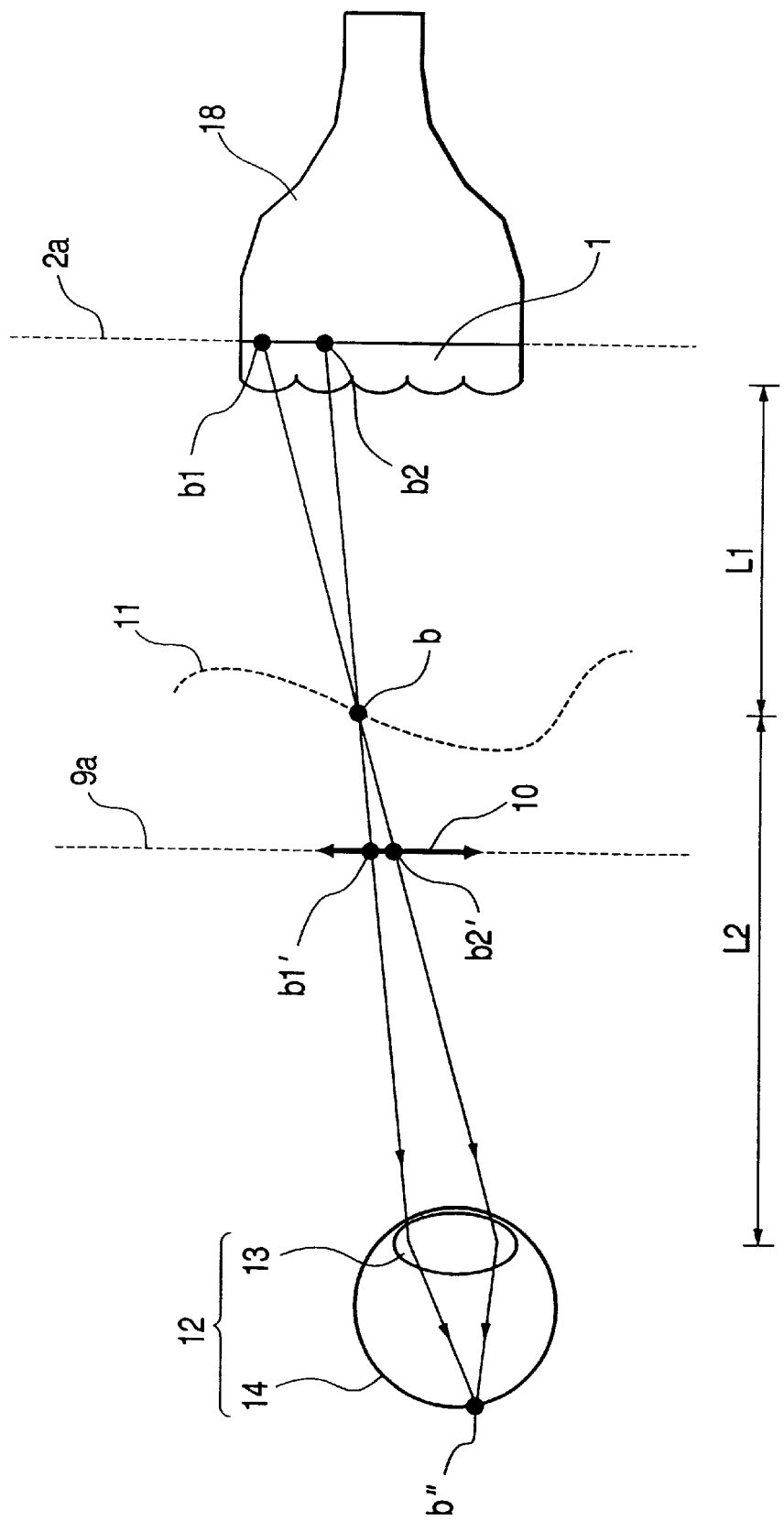
FIG. 8A is a schematic diagram to show the main part of Embodiment 4 of the present invention.

The aforementioned embodiment disclosed the output of the three-dimensional still image using the image recording medium 2, but it is also possible to reproduce a three-dimensional dynamic image immediately by placing a high-resolution image display device 18 capable of displaying image information similar to that recorded in the image recording medium 2, on the image recording surface 2a, as illustrated in FIG. 8A.

In this case, image information to be displayed on the image recording surface 2a can be preliminarily obtained by either one of methods (1) and (2) shown below.

(1) Micro image information to be recorded on each of exposure areas corresponding to the respective element lenses is previously obtained by arithmetic operation in a computer, and then the micro image information is displayed on the image display device 18 upon reproduction.

Figure 8B:
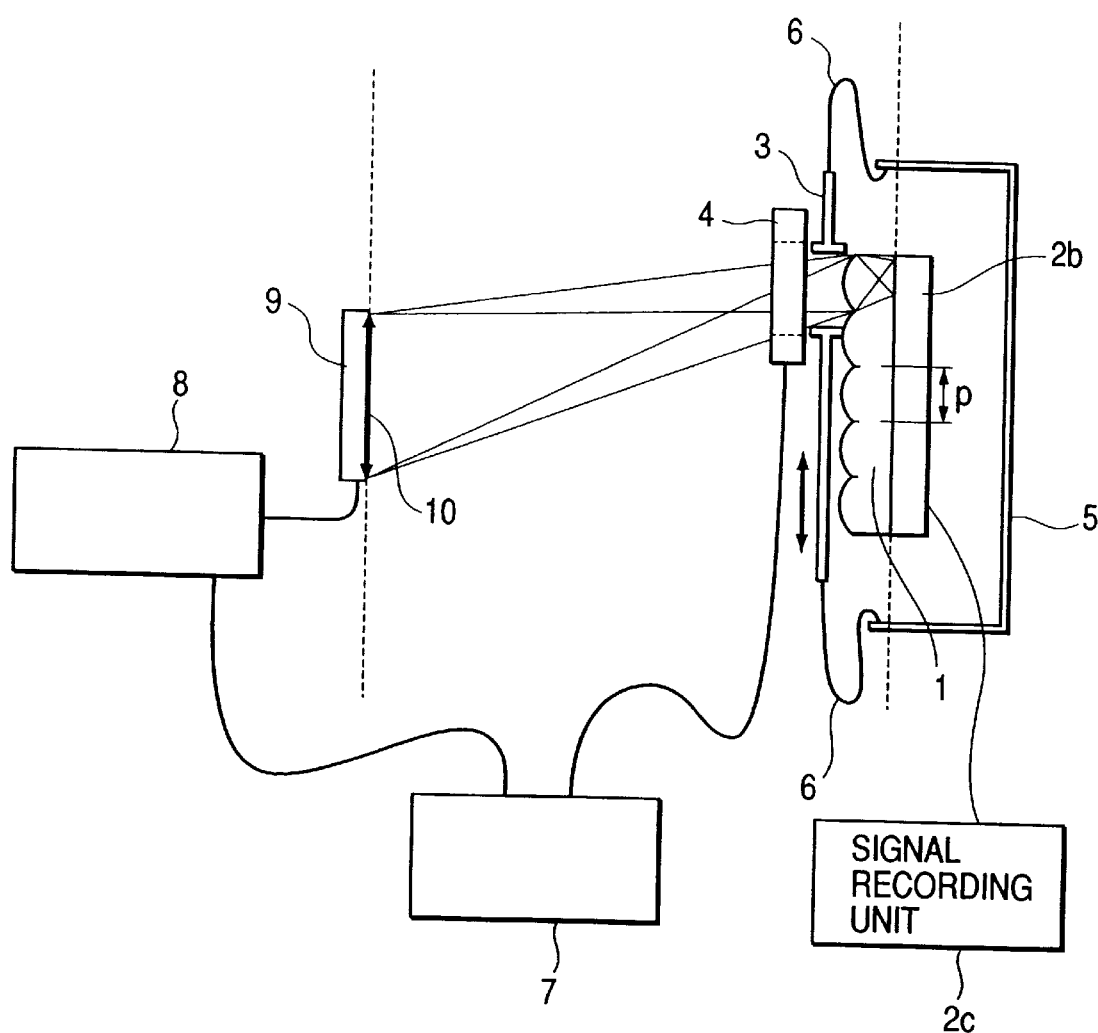
FIG. 8B is a schematic diagram of a structure including an image pickup device and a signal recording device according to an embodiment of the present invention.
Figure 9A:
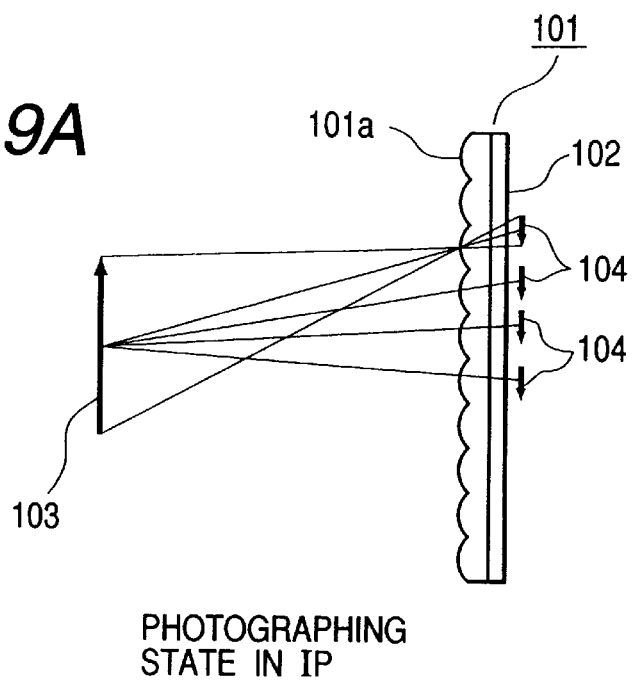
FIG. 9A and FIG. 9B are schematic diagrams to respectively show the main part of the conventional stereoscopic image recording apparatus and reproducing apparatus.
Figure 9B:
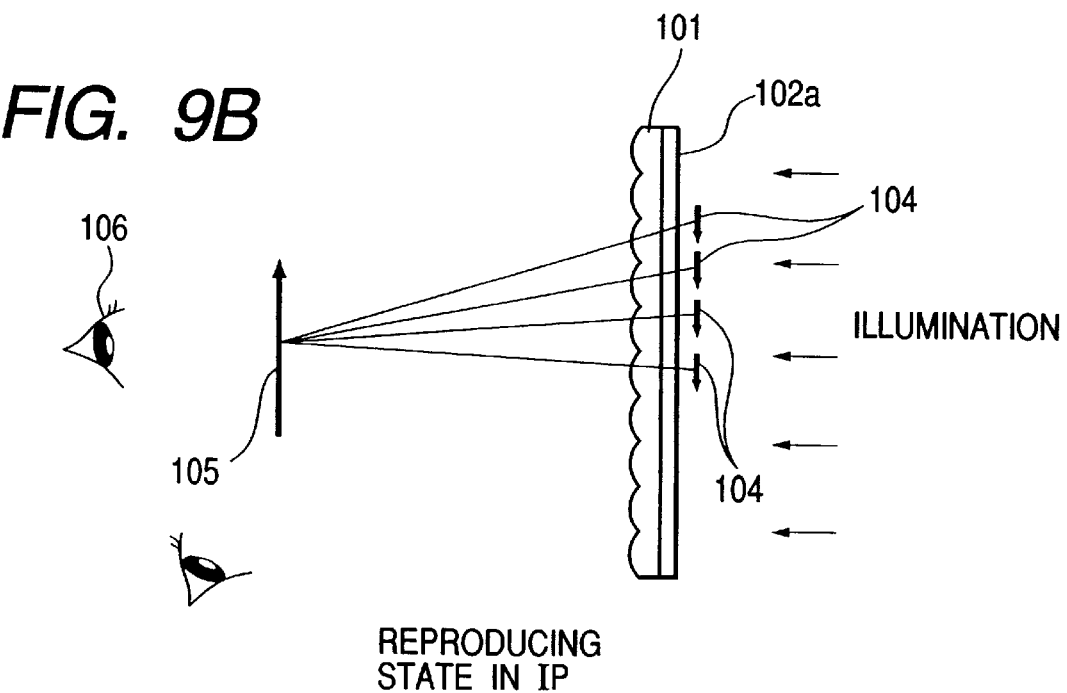
Figure 10:
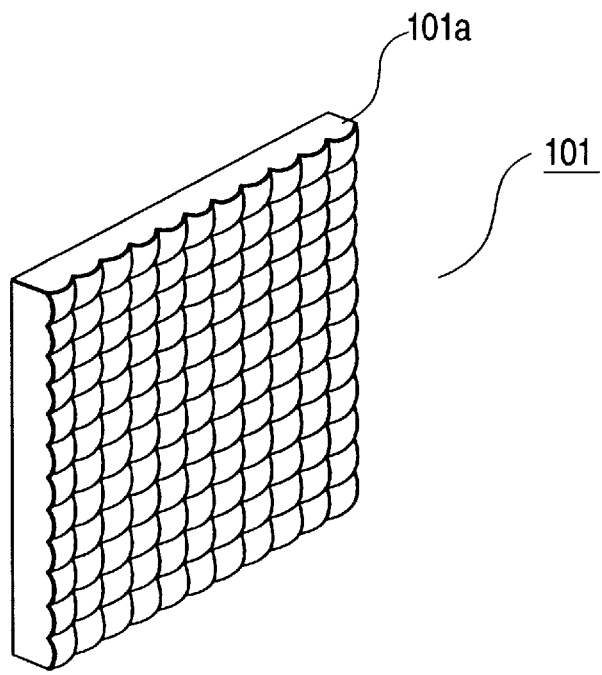
FIG. 10 is an explanatory diagram to show part of FIGS. 9A and 9B.
Figure 11:
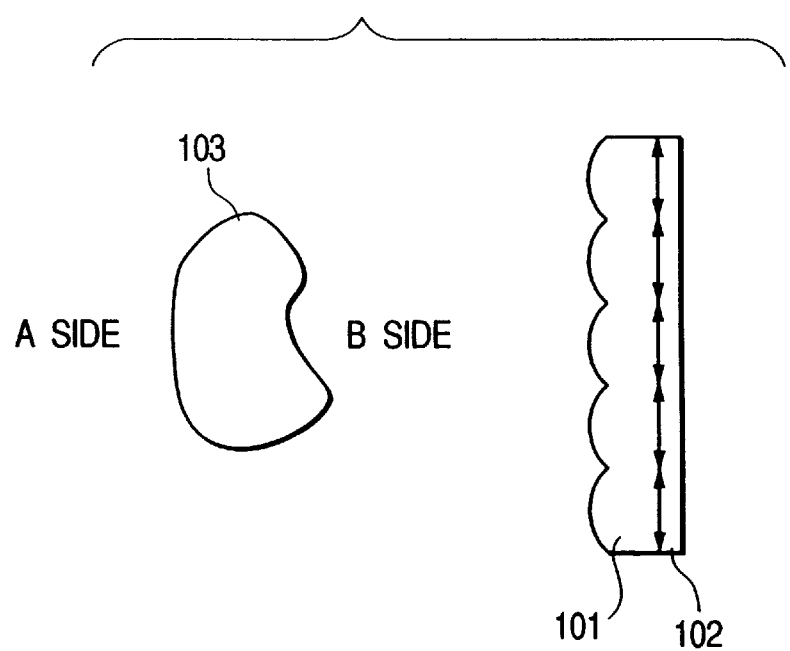
FIG. 11 is an explanatory diagram to explain a method for recording a stereoscopic image with the conventional stereoscopic image observing apparatus.

(2) An electronic image pickup device 26 such as CCD or the like as shown in FIG. 8B is placed instead of the image recording medium 2 shown in FIG. 1, and a set of micro image information is recorded on a signal recording unit 2c in the form of electrical signal. Thereafter, the micro image information is displayed on the image display device 18 upon reproduction.

The present invention can accomplish the image recording apparatus and the image reproducing apparatus that permit the observation of good stereoscopic image by making use of the recording and reproducing principles of three-dimensional image in the conventional IP (integral photo) method, by specifying the elements as described above.

What is claimed is:

1. An image recording apparatus comprising an image display device for displaying image information, a lens array comprising a plurality of element lenses for focusing the image information displayed in the image display device, said element lenses being arrayed at a predetermined pitch, image recording means placed at a focus plane of the lens array, and beam control means for controlling a beam passing through an aperture for each element lens out of the plurality of element lenses, wherein the image information displayed in the image display device for every element lens is successively recorded in the image recording means by the beam control means.

2. The image recording apparatus according to claim 1, wherein said beam control means comprises an aperture plate having an aperture a size of which is substantially equal to an aperture diameter of said element lenses and shutter means for controlling a beam passing through the aperture of the aperture plate, and wherein said aperture plate and shutter means are moved along a surface of said lens array.

3. The image recording apparatus according to claim 1, wherein said beam control means comprises a spatial light modulator capable of electronically controlling a transmittance distribution.

4. The image recording apparatus according to claim 1, wherein said image display device displays image information pieces different from each other and said beam control means is controlled in synchronism with the display to record the image information pieces in mutually different areas of said image recording means, each image information piece by one said element lens.

5. The image recording apparatus according to claim 1, wherein said lens array is comprised of a microlens array having a plurality of microscopic lenses arrayed two-dimensionally.

6. The image recording apparatus according to claim 1, wherein said lens array is comprised of a lenticular lens having a plurality of cylindrical lenses having a refractive power in a one-dimensional direction and arrayed in a predetermined direction.

7. The image recording apparatus according to claim 5, wherein an effective diameter of said microscopic lenses is not less than 0.5 mm nor more than 2 mm.

8. The image recording apparatus according to claim 6, wherein an effective diameter of said cylindrical lenses in the direction in which the cylindrical lenses have the refractive power is not less than 0.5 mm nor more than 2 mm.

9. An image reproducing apparatus comprising image information reproducing means for reproducing image information recorded by the image recording apparatus as set forth in any one of claims 1 to 8, wherein said image information reproducing means is placed to oppose to a lens array so that the image information is reproduced through said lens array by use of light illuminated from the image information reproducing means side.

10. An image reproducing apparatus according to claim 9, wherein said image information reproducing means is composed of an image display device for electronically displaying an image.

11. The image recording apparatus according to claim 1, wherein said image recording means is composed of an electronic image pickup device and a signal recording means.

* * * * *

UNITED STATES PATENT AND TRADEMARK OFFICE
CERTIFICATE OF CORRECTION

PATENT NO.      : 6,233,035 B1
DATED           : May 15, 2001
INVENTOR(S)     : Sudo Toshiyuki et al.

It is certified that error appears in the above-identified patent and that said Letters Patent is hereby corrected as shown below:

Column 2,
Line 22, "method. (1-1)" should read -- method. ¶(1-1) --.

Column 5,
Line 67, "eye." should read -- the eye. --.

Column 6,
Line 11, "d=p" should read -- d ≅ p --.

Column 8,
Line 52, "to oppose to" should read -- to oppose --.

Signed and Sealed this

Eighth Day of October, 2002

Attest:

JAMES E. ROGAN
Attesting Officer         Director of the United States Patent and Trademark Office